（12） United States Patent
Chavan et al.

(10) Patent No.: US 10,988,672 B2
(45) Date of Patent: Apr. 27, 2021

(54) DEFOAMING COMPOSITION COMPRISING A TALL-OIL-DERIVED SURFACTANT

(71) Applicant: Halliburton Energy Services, Inc., Houston, TX (US)

(72) Inventors: Sandeep Vasant Chavan, Pune (IN); Alan William Marr, Arbroath (GB); Mahesh Vijaykumar Biyani, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 39 days.

(21) Appl. No.: 16/605,178

(22) PCT Filed: Nov. 15, 2018

(86) PCT No.: PCT/US2018/061212
§ 371 (c)(1),
(2) Date: Oct. 14, 2019

(87) PCT Pub. No.: WO2020/101683
PCT Pub. Date: May 22, 2020

(65) Prior Publication Data
US 2021/0047558 A1 Feb. 18, 2021

(51) Int. Cl.
*C09K 8/584* (2006.01)
*C09K 8/60* (2006.01)
(Continued)

(52) U.S. Cl.
CPC .............. *C09K 8/584* (2013.01); *C09K 8/602* (2013.01); *C09K 8/82* (2013.01); *C09K 8/035* (2013.01); *C09K 8/518* (2013.01); *C09K 8/703* (2013.01)

(58) Field of Classification Search
CPC ........ C09K 8/035; C09K 8/518; C09K 8/584; C09K 8/602; C09K 8/703; C09K 8/82
See application file for complete search history.

(56) References Cited

U.S. PATENT DOCUMENTS 3,259,586 A * 7/1966 Dickson ................ C07C 209/08
516/9
4,123,383 A 10/1978 Ihde, Jr.
(Continued)

FOREIGN PATENT DOCUMENTS

EP 2486997 8/2012
WO 2017201109 11/2017

OTHER PUBLICATIONS

ISRWO International Search Report and Written Opinion for PCT/US2018/061212 dated Aug. 13, 2019.

*Primary Examiner* — Aiqun Li
(74) *Attorney, Agent, or Firm* — Tenley Krueger; C. Tumey Law Group PLLC

(57) ABSTRACT

The present disclosure may be directed to defoaming methods and compositions. A method of treating a subterranean formation may comprise providing a defoaming composition, wherein the defoaming composition comprises a tall-oil-derived surfactant. The method may further comprise mixing the defoaming composition with an aqueous fluid to form a treatment fluid such that foaming in the treatment fluid is reduced, wherein the treatment fluid is a water-based fluid. The method may further comprise placing the treatment fluid into the subterranean formation.

12 Claims, 1 Drawing Sheet

(51) Int. Cl.
   *C09K 8/82*    (2006.01)
   *C09K 8/035*   (2006.01)
   *C09K 8/518*   (2006.01)
   *C09K 8/70*    (2006.01)

(56) References Cited

U.S. PATENT DOCUMENTS

| | | | |
|---|---|---|---|
| 5,587,354 A | * | 12/1996 | Duncan, Jr. .............. C09K 8/22 507/137 |
| 5,601,752 A | | 2/1997 | Jenkins |
| 5,744,066 A | | 4/1998 | Oppenlander et al. |
| 2003/0224945 A1 | | 12/2003 | Twu et al. |
| 2004/0110642 A1 | | 6/2004 | Thompson et al. |
| 2008/0257554 A1 | | 10/2008 | Zamora et al. |
| 2014/0318785 A1 | | 10/2014 | Reddy et al. |
| 2016/0137901 A1 | * | 5/2016 | Bickford ................ C09K 8/035 166/308.2 |

\* cited by examiner

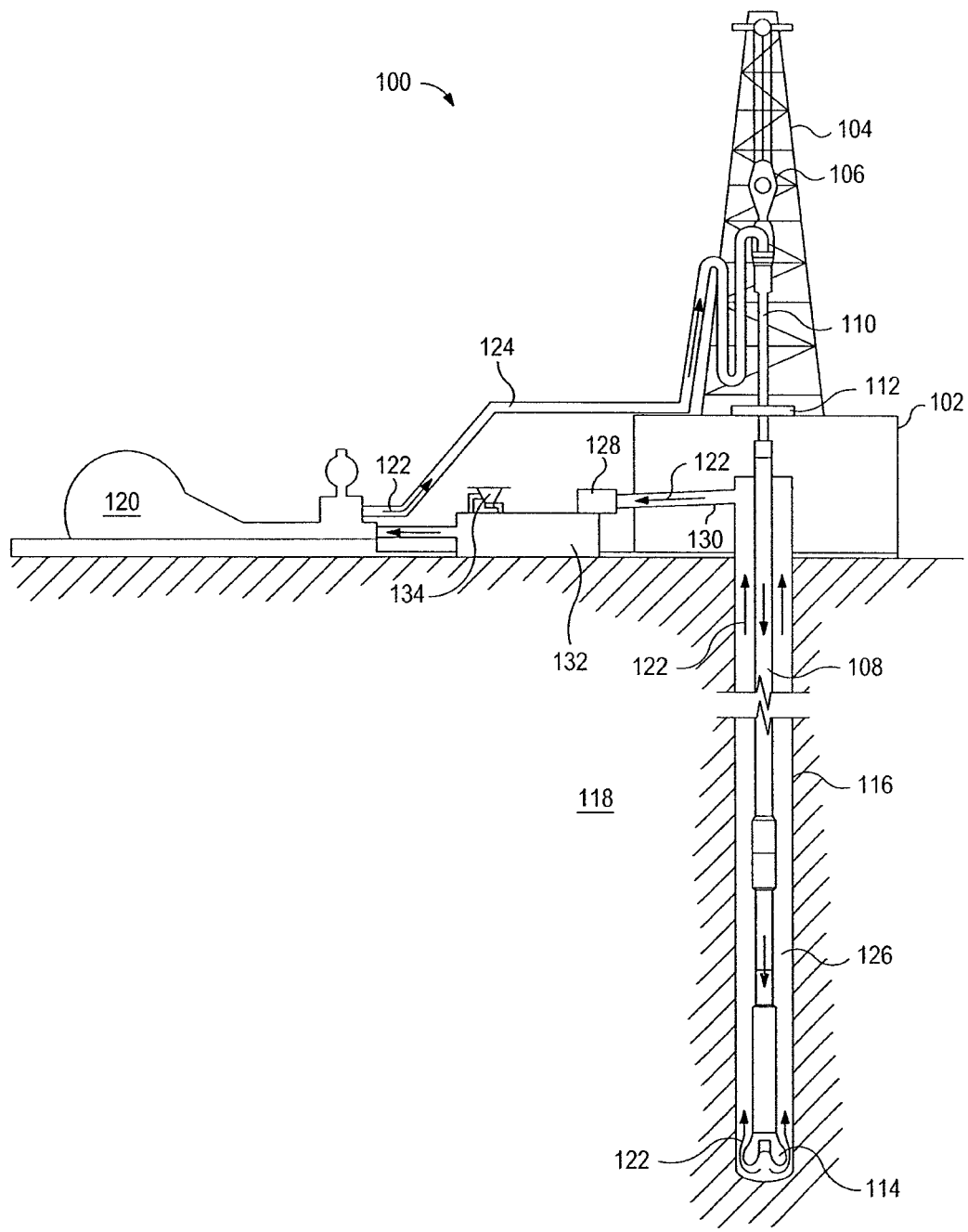

DEFOAMING COMPOSITION COMPRISING A TALL-OIL-DERIVED SURFACTANT

BACKGROUND

Defoaming compositions have long been used in the oil and gas industry and other industries to hinder the formation of foam, hinder entrainment of a gas in a liquid, or break previously formed foam. For example, defoaming compositions are commonly utilized as components in liquids used in subterranean operation, such as well treatment fluids to hinder the formation of foam or the entrainment of a gas in the liquids during the preparation and/or pumping of the fluid. Also, defoaming compositions have traditionally been utilized for breaking previously foamed treatment fluids. For example, when a foamed well treatment fluid must be disposed of on the surface, a defoaming composition may be added to the fluid to destroy the foam, thus, facilitating disposal of the liquid components of the treating fluid into a wellbore.

Defoaming compositions and methods may be employed to avoid adverse consequences associated with inadvertent formation of foam or entrainment of gas in well treatment fluids, such as drilling fluids, stimulation fluids, cement compositions, and completion fluids. For example, if well treatment fluids are inadvertently foamed or air is entrained into the fluids while being agitated, mixed and/or pumped, an associated change in density of the well treatment fluid may interfere with the operation of pumps (e.g., positive displacement pumps) designed to move the well treatment fluid. In another example, foaming and entrained gas may impact the desired operation of the well treatment fluid by changing the characteristics (e.g., density or viscosity) of the well treatment fluid. For example, if a well cement composition is foamed or otherwise entrains air during pumping and/or mixing, the density of the resulting cement composition may be considerably lower than the desired or required density. This reduction in the density of the cement composition may prevent the cement composition from exerting a desired hydrostatic pressure on a formation, prevent the cement composition from having sufficient compressive strength, and so forth.

A variety of defoaming compositions have traditionally been utilized in the oil and gas industry. Traditional defoaming compositions may exhibit poor defoaming behavior in fluids with specific lubricating agents that may give rise to highly stable foams. These highly stable foams may be detrimental during the mud mixing, drilling operations, and even at the screen shakers. Currently used defoaming compositions may function adequately to prevent the formation of foam in well treatment fluids when they are prepared and pumped, they may not function adequately for defoaming previously foamed well treatment fluids.

BRIEF DESCRIPTION OF THE DRAWINGS

For a detailed description of the preferred embodiments of the invention, reference will now be made to the accompanying drawing in which:

The FIGURE illustrates a drilling assembly.

DETAILED DESCRIPTION

The present disclosure may be directed to defoaming methods and compositions. In general, a defoaming composition should hinder the formation of foam or break foam present in a treatment fluid. For example—the defoaming composition may enable trapped gas to escape from the liquid, thus reducing an amount of gas entrained in the liquid. Accordingly, defoaming compositions of the present invention may be included in treatment fluids (e.g., drilling fluids, fracturing fluids, cement compositions and other treatment fluids known in the art) to hinder foaming or air entrainment during agitating, mixing, or pumping such fluids. Additionally, defoaming compositions may break or reduce foam and entrained air that is already present in a treatment fluid.

The treatment fluid may be any suitable treatment fluid for use in a variety of downhole applications. Suitable downhole applications may include, but are not limited to, drilling operations, lost circulation management operations, stimulation operations, sand control operations, perforating operations, completion operations, acidizing operations, scale inhibiting operations, water-blocking operations, clay stabilizer operations, fracturing operations, frac-packing operations, gravel packing operations, wellbore strengthening operations, sag control operations, and displacing solids laden drilling fluid, for example. Suitable treatment fluids may include, but are not limited to, stimulation fluids (e.g., fracturing fluids, acidizing fluids, etc.), drilling fluids, completion fluids, for example. Suitable treatment fluids may have a density of about 5.5 lb/gal (0.6 kg/L) or greater. For example, suitable treatment fluids may have a density at a point in range of from about 5.5 lb/gal (0.6 kg/L) to about 18.5 lb/gal (2.2 kg/L), or from about 7.5 lb/gal (0.9 kg/L) to about 18.5 lb/gal (2.2 kg/L), or from about 8.5 lb/gal (1 kg/L) to about 15 lb/gal (1.8 kg.L).

The treatment fluid is generally a water-based fluid that may include an aqueous fluid. In contrast to oil-based fluids (i.e., water-in-oil or invert emulsions) with an oil continuous phase, the continuous phase of a water-based fluid is the aqueous fluid, which is also the major component of the water-based fluid by volume. The aqueous fluid may be from any source provided that it does not contain an excess of compounds that may undesirably affect other components in the treatment fluid, for example, it may be desirable that there are no compounds present in the water that raise the alkalinity of the treatment fluids unless it is desirable to do so. The aqueous fluid may include water. The water may be fresh water or salt water. Salt water may generally include one or more dissolved salts therein and may be saturated or unsaturated as desired for a particular application. Seawater or brines may be suitable for use in some applications. Brines in the treatment fluid may include a brine or a combination of brines. Suitable brines may be saturated or unsaturated as desired for a particular application. One or more salts may be added to water to provide a brine that includes the dissolved salt and the water. Suitable dissolved salts may include monovalent and divalent salts. Mixtures of monovalent, divalent, and trivalent salts may also be used. Suitable monovalent salts may include, but are not limited to, sodium chloride, sodium bromide, potassium bromide, potassium chloride, potassium formate cesium formate, potassium formate, and mixtures thereof among others. Suitable divalent salts may include, but are not limited to, calcium bromide, zinc bromide, calcium chloride, and mixtures thereof. In an embodiment, the brine may include calcium bromide, and/or any combinations thereof. In a non-limiting example, one salt may be used to prepare the brine. In another embodiment, multiple salts may be used to prepare the brine. Specific examples of suitable brines may include a calcium bromide brine, a combination thereof. In some examples, the brine may be free or essentially free of zinc and cesium formate. The brine may be provided in any amount or concentration such as unsaturated, saturated, supersaturated, and saturated with additional solids. The brine may be present in the treatment fluid in any suitable amount. Further, the aqueous fluid may be present in an amount sufficient to form a pumpable fluid, including, but not limited to, an amount ranging from about 50% to about 90%, or about 50% to about 60%, or about 70% to about 80% based on a total weight of the foamed treatment fluid. With the benefit of this disclosure one of ordinary skill in the art should recognize the appropriate amount of water for a chosen application.

The treatment fluid may include a defoaming composition. A defoaming composition should reduce foam, for example, by allowing trapped gases within the treatment fluid to readily escape from the treatment fluid thereby reducing a volume of foam present in the treatment fluid and/or preventing additional foam from forming. The defoaming composition may include a tall-oil-derived surfactant. The defoaming composition may be present in the treatment fluid in any suitable amount including, but not limited to, about 0.025 wt. % to about 3 wt. %, or about 0.025 wt. % to about 0.5 wt. %, or about 0.5 wt. % to about 3 wt. % based on a total weight of the treatment fluid. Optionally, the defoaming composition may be present in the treatment fluid in an amount, for example, of about 0.001 wt. % to about 20 wt. %, or about 0.001 wt. % to about 5 wt. %, or about 5 wt. % to about 10 wt. %, or about 10 wt. % to about 20 wt. % based on a total weight of the treatment fluid. In an embodiment, the defoaming composition may be present in the treatment fluid in an amount of about 1% or less by weight of the treatment fluid. The defoaming composition may be suitable for use in a wide range of temperatures. The defoaming composition may be suitable in applications with temperatures that range from about 30° C. to about 200° C.

The defoaming composition may include a tall-oil-derived surfactant. Tall-oil-derived surfactants have conventionally been used as an emulsifying surfactant to facilitation formation of an invert emulsion in oil-based fluids. However, the tall-oil-derived surfactants are disclosed herein for use in a different system, water-based fluids, and for a different function, defoaming. Tall oil is a viscous liquid that is a by-product of the Kraft process of wood manufacture. The composition of tall oil varies, depending, for example, on the type of wood used, but generally may include unsaturated and fatty acids. The tall oil may be processed to obtain tall oil fatty acid. As used herein, the term "tall-oil-derived surfactant" refers to surfactants obtained from tall oil fatty acids. Suitable tall-oil-derived surfactants may include, but are not limited to, amines, esters, and amides. An example of a suitable tall-oil derived surfactant may include a reaction product of tall oil fatty acids with diethylenetriamine, maleic anhydride, tetraethylenepentamine, and triethylenetetramine. The tall-oil-derived surfactant may be present in the defoaming composition in any suitable amount including but not limited to, about 20 wt. % to about 100 wt. %, or about 20 wt. % to about 50 wt. %, or about 50 wt. % to about 80 wt. %, or about 80 wt. % to about 99.5 wt. % based on a total weight of the defoaming composition. The defoaming composition may be added to the treatment fluid by way of a carrier fluid, wherein the carrier fluid may be an oil based fluid. Any suitable oil based fluid may be used including but not limited to, light mineral oil, diesel oil, a glycol ether solvent, a hydrotreated light petroleum distillate having about 9 to 16 carbon atoms, ethylene glycol monobutyl ether, diethylene glycol monobutyl ether, and combinations thereof. An example of a suitable carrier fluid may include a mixture of hydrotreated light petroleum distillate having about 9 to 16 carbon atoms, ethylene glycol monobutyl ether, and diethylene glycol monobutyl ether. Where used, the carrier fluid fluid may be present in an amount, for example, of about 0.5 wt. % to about 80 wt. %, or about 0.5 wt. % to about 25 wt. %, or about 25 wt. % to about 50 wt. %, or about 50 wt. % to about 80 wt. % based on a total weight of the tall-oil-derived surfactant and the carrier fluid. Optionally, the tall-oil-derived surfactant may be added to the treatment fluid without the presence of a carrier fluid. Along with the present disclosure, one of ordinary skill in the art would be able to determine the appropriate form of the emulsifying surfactant to be added to the treatment fluid for a given application.

The defoaming composition may further include a base oil. Any suitable oil component may be used. The base oil may or may not be combined with additional oils or miscible components. Suitable oil components may include but are not limited to, diesel oils, paraffinic oils, light mineral oils, synthetic oils, glycol ether solvents, linear and branched alkanes with about 9 to 21 carbon atoms, de-aromatized kerosene with about 10 to 16 carbon atoms, deodorized kerosene with about 10 to 16 carbon atoms, or other such hydrocarbons, and combinations of these fluids. Paraffins or paraffinic oils useful in fluids including invert emulsion may be linear, branched, poly-branched, cyclic, or isoparaffins, preferably having about 10 to about 30 carbon atoms. The base oil may be present in the defoaming composition in any suitable amount, including but not limited to, about 25 wt. % to about 99.5 wt. %, or about 25 wt. % to about 50 wt. %, or about 50 wt. % to about 75 wt. %, or about 75 wt. % to about 99.5 wt. % based on a total weight of the defoaming composition.

It should be noted that the term "oil," as used herein, is not limited to a viscous liquid derived from petroleum. The term "oil," as used herein, may also refer to organic oils, synthetic oils, oils derived from petroleum products, mineral oils, the like, and/or any combination thereof. One of ordinary skill in the art, along with the present disclosure would be able to select the appropriate type of oil for a given application.

The tall-oil-derived surfactant and the base oil may be present in the defoaming composition in any suitable ratio capable of reducing the amount of foam produced. For example, the tall-oil-derived surfactant to base oil weight ratio may range from about 25:75 to about 75:25 or from about 50:50 to about 75:25 or from about 25:75 to about 50:50. In an embodiment, the tall-oil-derived surfactant to base oil weight ratio may be about 50:50. Optionally, the tall-oil-derived surfactant to base oil weight ratio may be about 75:25. One of ordinary skill in the art with the present disclosure would be able to choose the correct weight ratio of tall-oil-derived surfactant to base oil for a given application and should not be limited to the embodiments herein.

The defoaming composition may be prepared in any suitable manner. In an embodiment, the tall-oil-derived surfactant and the base oil may be mixed together and then added to the treatment fluid. In an embodiment, the defoaming composition may be added before or after a lubricant may be added to the treatment fluid. In an embodiment, the treatment fluid may be suspect to have foaming tendencies. Optionally, as the treatment fluid is prepared, the defoaming composition may be added to the treatment fluid. This may be done to reduce the suspected foaming tendencies of the prepared treatment fluid. In an embodiment, the treatment fluid may have foamed after preparation and optionally after the treatment fluid may be disposed downhole. It may be advantageous to add the defoaming composition to the treatment fluid once foam has formed after preparation of the treatment fluid and/or after the treatment fluid is disposed downhole. In an embodiment, the defoaming composition may be mixed into the treatment fluid. The defoaming composition may be added to the treatment fluid in any suitable manner and should not be limited to the disclosure herein. One of ordinary skill in the art, along with the present disclosure, would be able to determine the appropriate preparation/addition of the defoaming composition to a treatment fluid for a given application.

The treatment fluid may further include a lubricant. Undesirably, lubricants may produce stable forms when used in aqueous fluids, even in the presence of conventional defoamers. However, the defoaming compositions disclosed herein may reduce the tendency of foam formation, even in the presence of a lubricant. Any suitable lubricant may be used, including but not limited to, fatty esters, phosphate ethers, vegetable oils such as coconut oil and palm oil, glycols, amides, sulfurized tall oils, and light petroleum distillates having about 9 to 16 carbon atoms. Where used, the lubricant may be present in the treatment fluid in any suitable amount, including but not limited to, about 0.05 wt. % to about 20 wt. %, or about 0.1 wt. % to about 10 wt. %, or about 0.25 wt. % to about 5 wt. % based on a total weight of the treatment fluid.

Once the defoaming composition is added to the treatment fluid, the treatment fluid may be tested to determine its foam index. The term "foam index" as used herein is understood to mean the percentage increase in fluid volume due to foaming. This may be determined by comparing the original volume of the sample treatment fluid with the final volume of the sample treatment fluid. In an embodiment, the percentage of the volume increase is then estimated to provide the foam index for a given sample. The foam index may be visually estimated in some cases. One of ordinary skill in the art, along with the present disclosure, would be able to determine the foam index for a given sample through a variety of tests and methods and should not be limited to the disclosed tests and methods.

In an embodiment, the defoaming composition may have a defoam time. As used herein, defoam time is meant to be understood as a time period it takes for the defoaming composition to destabilize the treatment fluid and lower the interfacial tension between the lubricant and water present in the treatment fluid such that, little or no foam (indicating a foam volume reduced to <5% or <1% or <0.1% as compared to initial foam which could be as high as 50%) is present in the treatment fluid. In an embodiment, the treatment fluid may be classified as having little or no foam when the amount of entrained gas present in the treatment fluid is about 1 vol. % of entrained gas per a total volume of treatment fluid or less. It is to be understood that the defoam time begins once the defoaming composition is added to the treatment fluid and it ends once little or no foam is present in the treatment fluid. Typically, defoam time for conventional defoaming compositions may range from about 11 minutes to about 15 minutes. In an embodiment, the defoam time for the presently disclosed defoaming composition may range from about 2 minutes to about 10 minutes. In an embodiment, the defoam time may be inversely proportional to the amount of defoaming composition present in the treatment fluid.

Treatment fluids may further include additional additives. Any suitable additional additive may be used, including but not limited to, a weighting agent, an inert solid, a fluid loss control agent, a dispersion aid, a corrosion inhibitor, an emulsion thinner, an emulsion thickener, a viscosifying agent, a gelling agent, a surfactant, a particulate, a proppant, a gravel particulate, a lost circulation material, a gas, a pH control additive, a drilling surfactant, a breaker, a biocide, a crosslinker, a chelating agent, a scale inhibitor, a gas hydrate inhibitor, a mutual solvent, an oxidizer, a reducer, a friction reducer, a clay stabilizing agent, silica scale control additive, a gel stabilizer, an anti-oxidant, a lubricant, a polymer degradation prevention additive, a relative permeability modifier, an iron control agent, a particulate diverter, an acid, a catalyst, a flocculant, a scavenger (e.g., $H_2S$ scavengers, $CO_2$ scavengers or $O_2$ scavengers), a bridging agent, a solubilizer, a consolidating agent, a bactericide, and combinations thereof.

The treatment fluid may further include a pH modifier. Any suitable pH modifier may be used in the treatment fluid, including but not limited to, sodium hydroxide, potassium hydroxide, magnesium oxide, hydrated and unhydrated lime, acetic acid, other weak acids, other strong acids, other weak bases, other strong bases, and/or combinations thereof.

In an embodiment, the defoaming composition may be prepared and then added to a treatment fluid. The defoaming composition may be added to any suitable treatment fluid. The defoaming composition and the treatment fluid may then be mixed for a predetermined time period. Optionally, additional additives may be mixed into the treatment fluid and/or injected into the treatment fluid at any point during treatment of the wellbore. In an embodiment, the treatment fluid may then be disposed downhole in a wellbore, wherein the treatment fluid may perform a variety of functions.

The FIGURE illustrates a drilling assembly 100 in which a drilling fluid 122 as disclosed above may be used. It should be noted that while the FIGURE generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 may support the drill string 108 as it is lowered through a rotary table 112. A drill bit 114 may be attached to the distal end of the drill string 108 and may be driven either by a downhole motor and/or via rotation of the drill string 108 from the well surface. The drill bit 114 may include, but is not limited to, roller cone bits, PDC bits, natural diamond bits, any hole openers, reamers, coring bits, etc. As the drill bit 114 rotates, it may create a wellbore 116 that penetrates various subterranean formations 118.

Drilling fluid 122 including an tall-oil-derived surfactant and a base oil may be prepared. Additionally, drilling fluid 122 may further include a lubricant, any suitable lubricant may be used. A pump 120 (e.g., a mud pump) may circulate drilling fluid 122 through a feed pipe 124 and to the kelly 110, which conveys the drilling fluid 122 downhole through the interior of the drill string 108 and through one or more orifices in the drill bit 114. The drilling fluid 122 may then be circulated back to the surface via an annulus 126 defined between the drill string 108 and the walls of the wellbore 116. At the surface, the recirculated or spent drilling fluid 122 may exit the annulus 126 and may be conveyed to one or more fluid processing unit(s) 128 via an interconnecting flow line 130. The fluid processing unit(s) 128 may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and/or any fluid reclamation equipment. The fluid processing unit(s) 128 may further include one or more sensors, gauges, pumps, compressors, and the like used store, monitor, regulate, and/or recondition the drilling fluid.

After passing through the fluid processing unit(s) 128, a "cleaned" drilling fluid 122 may be deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure. One or more of the drilling fluid additives may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. Alternatively, the drilling fluid additives may be added to the drilling fluid 122 at any other location in the drilling assembly 100. While the FIGURE shows only a single retention pit 132, there could be more than one retention pit 132, such as multiple retention pits 132 in series. Moreover, the retention put 132 may be representative of one or more fluid storage facilities and/or units where the drilling fluid additives may be stored, reconditioned, and/or regulated until added to the drilling fluid 122. During drilling, drilling fluid 122 may form foam. Defoaming composition present in the drilling fluid may break the foam in a suitable time frame. In an embodiment, the presence of the defoaming composition in drilling fluid 122 may prevent the formation of foam.

The drilling fluids disclosed herein may directly or indirectly affect one or more components or pieces of equipment associated with the preparation, delivery, recapture, recycling, reuse, and/or disposal of the disclosed drilling fluids. For example, the disclosed drilling fluids may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary drilling fluids. The disclosed drilling fluids may also directly or indirectly affect any transport or delivery equipment used to convey the drilling fluids to a well site or downhole such as, for example, any transport vessels, conduits, pipelines, trucks, tubulars, and/or pipes used to compositionally move the drilling fluids from one location to another, any pumps, compressors, or motors (e.g., topside or downhole) used to drive the drilling fluids into motion, any valves or related joints used to regulate the pressure or flow rate of the drilling fluids, and any sensors (i.e., pressure and temperature), gauges, and/or combinations thereof, and the like. The disclosed drilling fluids may also directly or indirectly affect the various downhole equipment and tools that may come into contact with the drilling fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Accordingly, this disclosure describes methods, systems, and apparatuses that may use chemically tagged drilling fluid additives in cementing operations. The methods, systems, and apparatuses may include any of the following statements:

Statement 1: A method of treating a subterranean formation, the method including: providing a defoaming composition, wherein the defoaming composition includes a tall-oil-derived surfactant; mixing the defoaming composition with an aqueous fluid to form a treatment fluid such that foaming in the treatment fluid is reduced, wherein the treatment fluid is a water-based fluid; and placing the treatment fluid into the subterranean formation.

Statement 2: The method of statement 1, wherein the tall-oil-derived surfactant is a reaction product of tall oil fatty acids and one or more amines.

Statement 3: The method of statement 1, wherein the tall-oil-derived surfactant is a reaction product of tall oil fatty acids with reactants including diethylenetriamine, maleic anhydride, tetraethylenepentamine, and triethylenetetramine.

Statement 4: The method of any one of statements 1 to 3, wherein the defoaming composition further includes a base oil.

Statement 5: The method of statement 4, wherein the base oil includes at least one component selected from the group consisting of diesel oil, paraffinic oil, light mineral oil, synthetic oil, glycol ether solvent, and any combination thereof.

Statement 6: The method of statement 4 or statement 5, wherein the tall-oil-derived surfactant and the base oil have a weight ratio of about 50:50 to about 75:25.

Statement 7: The method of any one of statements 1 to 6, wherein the treatment fluid further includes a lubricant.

Statement 8: The method of statement 7, wherein the lubricant is selected from the group consisting of a fatty ester, a phosphate ether, a vegetable oil, a glycol, an amide, a sulfurized tall oil, a light petroleum distillate having about 9 to 16 carbon atoms, and combinations thereof.

Statement 9: The method of any one of statements 1 to 8, wherein the defoaming composition is present in the treatment fluid in an amount of about 0.025 wt. % to about 10 wt. % by weight of the treatment fluid, and wherein the defoaming composition includes the tall-oil-derived surfactant in an amount of about 20 wt. % to about 100 wt. % based on a total weight of the defoaming composition.

Statement 10: The method of any one of statements 1 to 9, wherein the aqueous fluid includes at least one fluid selected from the group consisting of fresh water, salt water, brine, and any combination thereof.

Statement 11: The method of any one of statements 1 to 10, wherein the treatment fluid further includes at least one additional additive selected from the group consisting of a weighting agent, an inert solid, a fluid loss control agent, a dispersion aid, a corrosion inhibitor, an emulsion thinner, an emulsion thickener, a viscosifying agent, a gelling agent, a surfactant, a particulate, a proppant, a gravel particulate, a lost circulation material, a gas, a pH control additive, a drilling surfactant, a breaker, a biocide, a crosslinker, a chelating agent, a scale inhibitor, a gas hydrate inhibitor, a mutual solvent, an oxidizer, a reducer, a friction reducer, a clay stabilizing agent, silica scale control additive, a gel stabilizer, an anti-oxidant, a polymer degradation prevention additive, a relative permeability modifier, an iron control agent, a particulate diverter, an acid, a catalyst, a flocculant, a scavenger bridging agent, a solubilizer, a consolidating agent, a bactericide, and any combination thereof.

Statement 12: The method of any one of statements 1 to 11, wherein the treatment fluid has a defoam time of about 2 minutes to about 10 minutes after the mixing.

Statement 13: The method of any one of statements 1 to 12, wherein the treatment fluid is a drilling fluid, and placing the treatment fluid into the subterranean formation includes pumping the drilling fluid downhole through a drill string and past a drill bit, circulating the drilling fluid in a wellbore penetrating the subterranean formation and back to surface of the wellbore.

Statement 14: The method of statement 1, wherein the tall-oil-derived surfactant includes a reaction product of tall oil fatty acids with reactants including diethylenetriamine, maleic anhydride, tetraethylenepentamine, and triethylenetetramine, wherein the defoaming composition is present in the treatment fluid in an amount of about 0.025 wt. % to about 10 wt. % by weight of the treatment fluid, wherein the defoaming composition includes the tall-oil-derived surfactant in an amount of about 20 wt. % to about 100 wt. % based on a total weight of the defoaming composition, wherein the tall-oil-derived surfactant is provided in an oil-based carrier fluid, wherein the treatment fluid is a drilling fluid, wherein the placing the treatment fluid into the subterranean formation includes pumping the drilling fluid downhole through a drill string and past a drill bit, circulating the drilling fluid in a wellbore penetrating the subterranean formation and back to surface of the wellbore, and wherein the treatment fluid has a defoam time of about 2 minutes to about 10 minutes after the mixing.

Statement 15: A method of defoaming a treatment fluid including: providing a defoaming composition, wherein the defoaming composition includes an tall-oil-derived surfactant; and mixing the defoaming composition with an aqueous fluid to form the treatment fluid such that foaming in the treatment fluid is reduced, wherein the treatment fluid is water based, wherein the treatment fluid has a defoam time of about 2 minutes to about 12 minutes after the mixing.

Statement 16: The method of statement 15, wherein the defoaming composition further includes a base oil, wherein the tall-oil-derived surfactant and the base oil have a weight ratio of about 50:50 to about 75:25.

Statement 17: The method of statement 15 or statement 16, wherein the tall-oil-derived surfactant is a reaction product of tall oil fatty acids and one or more amines.

Statement 18: The method of any one of statements 15 to 17, wherein the aqueous fluid includes at least one fluid selected from the group consisting of fresh water, salt water, brine, and any combination thereof.

Statement 19: The method of any one of statements 15 to 18, wherein the treatment fluid after the defoam time includes entrained gas in an amount of about 1 wt. % by weight of the treatment or less.

Statement 20: The method of any one of statements 15 to 19, wherein the treatment fluid further including a lubricant.

To facilitate a better understanding of the present technique, the following examples of some specific embodiments are given. In no way should the following examples be read to limit, or to define, the scope of the invention.

EXAMPLE 1

Several defoaming compositions were added to a water-based drilling mud and then tested for their ability to reduce the amount of foam present in the water-based drilling fluid. First, the water-based drilling fluid was prepared and then hot rolled at 150° F. (about 65° C.), the composition of which is shown in Table 1.

TABLE 1

| Drilling Fluid Components | Mixing Time, (min) | Vol. % by Vol. of drilling fluid |
|---|---|---|
| Water | | 68.8 |
| Lubricant | 5 | 0.5 |
| KCl | 5 | 3.9 |
| NaCl | | 8.9 |
| Soda Ash | 5 | 0.1 |
| Potato starch | 5 | 1.8 |
| Poly anionic Cellulose | 5 | 0.6 |
| Xanthan Gum | 10 | 0.3 |
| Barite | 5 | 9 |
| Biocide | 5 | 0.04 |

Several defoaming compositions were added to the mixture in an amount of about 0.5 wt. % by a total weight of treatment fluid. The treatment fluid was mixed on a multi-mixer for about 5 minutes. The results of adding defoaming composition are shown in Table 2. Defoaming composition A-F are conventional defoaming compositions. The defoaming compositions are provided in the table below. Defoaming Composition G was a tall-oil-derived surfactant. The tall-oil derived surfactant was a reaction product of tall oil fatty acids and one or more of diethylenetriamine, maleic anhydride, tetraethylenepentamine, and triethylenetetramine in a carrier fluid. The carrier fluid included hydrotreated light petroleum distillate and/or ethylene glycol monbutyl ethers.

TABLE 2

| Defoaming composition | Volume Collected and tested (mL) | | | |
|---|---|---|---|---|
| | 0 min | 5 min | 15 min | % Foam |
| Blank | 355 | 355 | 350 | 75.0 |
| Defoaming composition A (Sulfated vegetable oil) | 280 | 275 | 270 | 35.0 |
| Defoaming composition B (Polyether Polyol) | 250 | 250 | 245 | 22.5 |
| Defoaming composition C (Phosphate Ether) | 250 | 245 | 245 | 22.5 |
| Defoaming composition D (Blended poly ether polyol) | 235 | 210 | 205 | 2.5 |
| Defoaming composition E (oxylated alcohols) | 260 | 255 | 245 | 22.5 |
| Defoaming composition F (glycol ether) | 275 | 270 | 260 | 30.0 |

TABLE 2-continued

| Defoaming composition | Volume Collected and tested (mL) | | | |
|---|---|---|---|---|
| | 0 min | 5 min | 15 min | % Foam |
| Defoaming composition G (tall-oil-derived surfactant) | 245 | 200 | 200 | 0.0 |

The original volume of each sample was approximately 200 ml. The foam index for each defoaming composition was determined by subtracting the volume of the sample tested after 15 min from the original volume of the sample tested. The resulting number was then divided by the original volume of the sample tested and then multiplied by 100. The resulting number is the percent foam for each defoaming composition.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

Although the present invention and its advantages have been described in detail, it should be understood that various changes, substitutions and alterations may be made herein without departing from the spirit and scope of the invention as defined by the appended claims.

What is claimed is:

1. A method of treating a subterranean formation, the method comprising:
   providing a defoaming composition, wherein the defoaming composition comprises a tall-oil-derived surfactant comprising a reaction product of tall oil fatty acids with reactants comprising diethylenetriamine, maleic anhydride, tetraethylenepentamine, and triethylenetetramine, and wherein the tall-oil-derived surfactant is provided in an oil-based carrier fluid:
   mixing the defoaming composition with an aqueous fluid to form a drilling treatment fluid such that foaming in the treatment drilling fluid is reduced, wherein the defoaming composition is present in the drilling fluid in an amount of about 0.025 wt. % to about 10 wt. % by weight of the drilling fluid, wherein the defoaming composition comprises the tall-oil-derived surfactant in an amount of about 20 wt. % to about 100 wt. % based on a total weight of the defoaming composition, wherein the drilling fluid is a water-based fluid, and wherein the drilling fluid has a defoam time of about 2 minutes to about 10 minutes after the mixing: and
   placing the drilling fluid into the subterranean formation, wherein the placing the drilling fluid into the subterranean formation comprises pumping the drilling fluid downhole through a drill string and past a drill bit, circulating the drilling fluid in a wellbore penetrating the subterranean formation and back to surface of the wellbore.

2. The method of claim 1, wherein the defoaming composition further comprises a base oil, wherein the base oil comprises at least one component selected from the group consisting of diesel oil, paraffinic oil, light mineral oil, synthetic oil, glycol ether solvent, and any combination thereof.

3. The method of claim 2, wherein the tall-oil-derived surfactant and the base oil have a weight ratio of about 50:50 to about 75:25.

4. The method of claim 1, wherein the drilling fluid further comprises a lubricant.

5. The method of claim 4, wherein the lubricant is selected from the group consisting of a fatty ester, a phosphate ether, a vegetable oil, a glycol, an amide, a sulfurized tall oil, a light petroleum distillate having about 9 to 16 carbon atoms, and combinations thereof.

6. The method of claim 1, wherein the aqueous fluid comprises at least one fluid selected from the group consisting of fresh water, salt water, brine, and any combination thereof.

7. The method of claim 1, wherein the drilling fluid further comprises at least one additional additive selected from the group consisting of a weighting agent, an inert solid, a fluid loss control agent, a dispersion aid, a corrosion inhibitor, an emulsion thinner, an emulsion thickener, a viscosifying agent, a gelling agent, a surfactant, a particulate, a proppant, a gravel particulate, a lost circulation material, a gas, a pH control additive, a drilling surfactant, a breaker, a biocide, a crosslinker, a chelating agent, a scale inhibitor, a gas hydrate inhibitor, a mutual solvent, an oxidizer, a reducer, a friction reducer, a clay stabilizing agent, silica scale control additive, a gel stabilizer, an anti-oxidant, a polymer degradation prevention additive, a relative permeability modifier, an iron control agent, a particulate diverter, an acid, a catalyst, a flocculant, a scavenger bridging agent, a solubilizer, a consolidating agent, a bactericide, and any combination thereof.

8. A method of defoaming a treatment fluid comprising:
   providing a defoaming composition, wherein the defoaming composition comprises an tall-oil-derived surfactant comprising a reaction product of tall oil fatty acids with reactants comprising diethylenetriamine, maleic anhydride, tetraethylenepentamine, and triethylenetetramine, and wherein the tall-oil-derived surfactant is provided in an oil-based carrier fluid: and
   mixing the defoaming composition with an aqueous fluid to form the treatment fluid such that foaming in the treatment fluid is reduced, wherein the treatment fluid is water based, wherein the defoaming composition is present in the treatment fluid in an amount of about 0.025 wt. % to about 10 wt. % by weight of the treatment fluid, wherein the defoaming composition comprises the tall-oil-derived surfactant in an amount of about 20 wt. % to about 100 wt. % based on a total weight of the defoaming composition, wherein the treatment fluid has a defoam time of about 2 minutes to about 12 minutes after the mixing.

9. The method of claim 8, wherein the defoaming composition further comprises a base oil, wherein the tall-oil-derived surfactant and the base oil have a weight ratio of about 50:50 to about 75:25.

10. The method of claim 8, wherein the aqueous fluid comprises at least one fluid selected from the group consisting of fresh water, salt water, brine, and any combination thereof.

11. The method of claim 8, wherein the treatment fluid after the defoam time comprises entrained gas in an amount of about 1 wt. % by weight of the treatment or less.

12. The method of claim 8, wherein the treatment fluid further comprising a lubricant.

\* \* \* \* \*